United States Patent
Rauch et al.

(10) Patent No.: US 11,377,088 B2
(45) Date of Patent: Jul. 5, 2022

(54) ELECTRIC VEHICLES WITH ENGINES AND INTERACTION WITH AFTERTREATMENT

(71) Applicant: Cummins Inc., Columbus, IN (US)

(72) Inventors: Jeffrey S. Rauch, Columbus, IN (US); Jennifer Kay Light-Holets, Greenwood, IN (US); Michael Haas, Columbus, IN (US)

(73) Assignee: Cummins Inc., Columbus, IN (US)

( * ) Notice: Subject to any disclaimer, the term of this patent is extended or adjusted under 35 U.S.C. 154(b) by 273 days.

(21) Appl. No.: 16/371,890

(22) Filed: Apr. 1, 2019

(65) Prior Publication Data

US 2019/0299974 A1 Oct. 3, 2019

Related U.S. Application Data

(60) Provisional application No. 62/651,445, filed on Apr. 2, 2018.

(51) Int. Cl.
*B60W 20/16* (2016.01)
*F02D 29/02* (2006.01)
(Continued)

(52) U.S. Cl.
CPC ............ *B60W 20/16* (2016.01); *B60W 20/13* (2016.01); *F01N 3/035* (2013.01); *F01N 3/2013* (2013.01); *F02D 29/02* (2013.01); *B60W 2510/06* (2013.01); *F02D 41/027* (2013.01); *F02D 41/0235* (2013.01)

(58) Field of Classification Search
CPC .. F02D 35/0015; F02D 41/0235; F02D 41/04; F02D 41/06; F02D 41/0255; F02D 41/027; F02D 29/06; F02D 2200/08; F02D 2250/36; F02D 41/024–0295; F02D 2041/026; F02D 29/02; B60W 10/06; B60W 20/16; B60W 10/24; B60W 10/08; B60W 2510/244; B60W 2510/06; B60W 20/13; F01N 3/00; F01N 11/00; F01N 2560/00; F01N 2900/16; F01N 9/00; F01N 9/002; F01N 3/023; F01N 2590/11; F01N 3/2066; F01N 3/10; F01N 3/2013; F01N 3/035; F02N 11/0829; Y02T 10/62; Y02T 10/40; Y02T 10/12; Y02A 50/20
See application file for complete search history.

(56) References Cited

U.S. PATENT DOCUMENTS 6,266,956 B1   7/2001   Suzuki et al.
6,301,529 B1   10/2001  Itoyama et al.
(Continued)

FOREIGN PATENT DOCUMENTS

FR         3025833 A1 *  3/2016   ......... F02D 41/0007
WO    WO-2005/012022 A1   2/2005

*Primary Examiner* — Behrang Badii
(74) *Attorney, Agent, or Firm* — Foley & Lardner LLP (57) ABSTRACT

Systems and methods to control operation of a system based on aftertreatment interaction include a controller structured to receive one or more parameters associated with an exhaust aftertreatment system of an electric vehicle, where the one or more parameters are associated with an aftertreatment event associated with the aftertreatment system, determine an operation state of the system based on the one or more parameters, and generate a command structured to adjust operation of the system responsive to the determination of the operation state.

20 Claims, 4 Drawing Sheets

(51) Int. Cl.
  *B60W 20/13*   (2016.01)
  *F01N 3/035*   (2006.01)
  *F01N 3/20*    (2006.01)
  *F02D 41/02*   (2006.01)

(56) References Cited

U.S. PATENT DOCUMENTS

| | | |
|---|---|---|
| 7,028,793 B2 | 4/2006 | Hu et al. |
| 8,438,837 B2 | 5/2013 | Hermansson et al. |
| 8,473,178 B2 | 6/2013 | Oe |
| 9,079,580 B2 | 7/2015 | Hernier et al. |
| 2010/0300781 A1* | 12/2010 | Leone ................ B60W 20/40 180/65.265 |
| 2014/0024492 A1* | 1/2014 | Dextreit ............. B60W 10/30 477/3 |
| 2016/0082949 A1 | 3/2016 | Jang |
| 2016/0252029 A1* | 9/2016 | Biagini .............. F02D 41/0255 60/320 |
| 2017/0044948 A1* | 2/2017 | Caine ................. F01N 3/0885 |
| 2017/0045004 A1* | 2/2017 | Naidu ................ F02B 63/04 |
| 2017/0051707 A1* | 2/2017 | Wright .............. F02D 41/10 |
| 2017/0335748 A1* | 11/2017 | Zhang ............... F28D 21/0003 |
| 2018/0222309 A1* | 8/2018 | Follen ............... B60W 10/08 |
| 2018/0257473 A1* | 9/2018 | Follen ............... B60L 53/68 |
| 2020/0011257 A1* | 1/2020 | Stretch .............. F02D 41/0255 |
| 2020/0332730 A1* | 10/2020 | Andersson ......... B01J 29/04 |

\* cited by examiner

ELECTRIC VEHICLES WITH ENGINES AND INTERACTION WITH AFTERTREATMENT

CROSS-REFERENCE TO RELATED APPLICATIONS

This application claims the benefit of and priority to U.S. Provisional Patent Application No. 62/651,445 filed Apr. 2, 2018, which is incorporated herein by reference in its entirety.

BACKGROUND

An internal combustion engine burns gasoline, fuel oil, or other types of fuel to generate mechanical power. The burning of such fuel occurs via the use of an oxidizer (e.g., air) inside the internal combustion engine. Combustion of the fuel and air in the compression chambers of the engine produces exhaust gas. The exhaust gas is, in turn, managed (e.g., received and treated) by an exhaust aftertreatment system. Oftentimes, electric vehicles that include an on-board diesel engine-generator are typically required to include the exhaust aftertreatment system to meet regulated exhaust emissions requirements.

SUMMARY

One implementation relates to a system including controller communicatively coupled with a system of an electric vehicle. The controller is structured to receive one or more parameters associated with an exhaust aftertreatment system, the one or more parameters being associated with an aftertreatment event associated with the aftertreatment system. The controller is further structured to determine an operation state of the system based on the one or more parameters, and generate a command structured to adjust operation of the system responsive to the determination of the operation state.

Another implementation relates to an apparatus structured to control operation of a system of an electric vehicle based on one or more parameters associated with an exhaust aftertreatment system. The apparatus includes a controller structured to receive one or more parameters associated with an exhaust aftertreatment system of an electric vehicle, where the one or more parameters are associated with an aftertreatment event associated with the aftertreatment system. The controller is further structured to determine an operation state of a system of the electric vehicle based on the one or more parameters, and generate a command structured to adjust operation of the system responsive to the adjustment of the operation state.

Another implementation relates to a method for controlling operation of a system of an electric vehicle based on one or more parameters associated with an exhaust aftertreatment system. The method includes receiving one or more parameters associated with an exhaust aftertreatment system of an electric vehicle, where the one or more parameters are associated with an aftertreatment event associated with the aftertreatment system. The method further includes determining an operation state of a system of the electric vehicle based on the one or more parameters, and generating a command structured to adjust operation of the system.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Embodiments described herein relate generally to a vehicle management system (e.g., a system management system) that includes a control system. In this regard, the control system can be structured to receive one or more parameters associated with an exhaust aftertreatment system. The one or more parameters can be associated with an aftertreatment event associated with the aftertreatment system. The control system can be structured to determine an operation state of the system based on the one or more parameters. In turn, the control system can be further structured to generate a command structured to adjust operation of the system responsive to the determination of the operation state.

Figure 1:
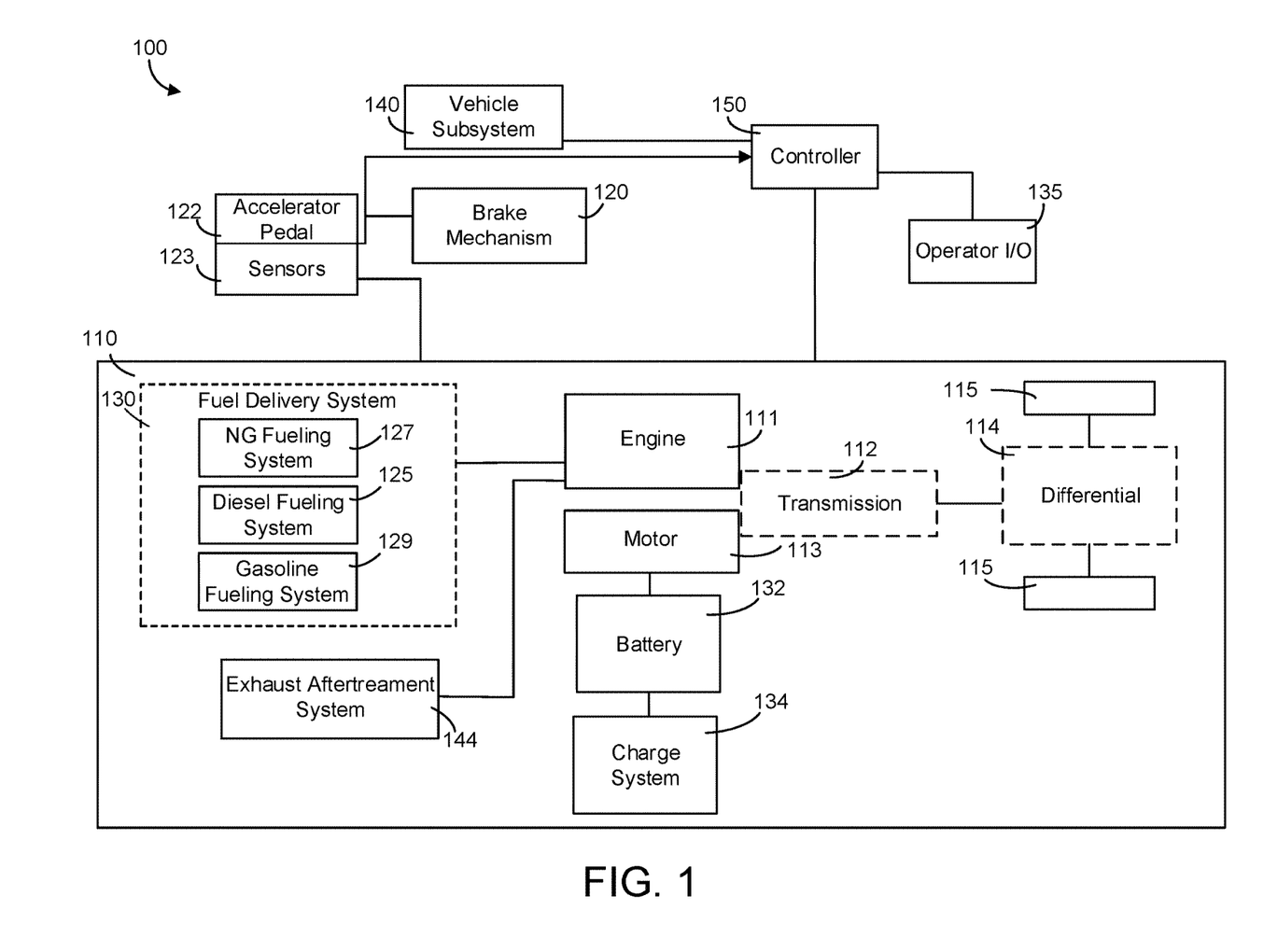
FIG. 1 is a schematic block diagram of an example vehicle including a controller according to an example embodiment.

FIG. 1 depicts a schematic block diagram of a vehicle 100 according to an example embodiment. The vehicle 100 can be a battery electric vehicle (BEV), range-extended electric vehicle (REEV), hybrid electric vehicle (HEV), plug-in hybrid electric vehicle (PHEV), extended-range electric vehicle (E-REV), range-extended battery-electric vehicle (BEVx), or another vehicle powered by or otherwise operable with a vehicle system such as, but not limited to, a battery, generator system (e.g., a power generator, generator plant, electric power strip, on-board rechargeable electricity storage system), an engine system, a motor system (e.g., an electric motor, traction motor, motor-generator unit), exhaust aftertreatment system, etc. The vehicle 100 can be operable in series (e.g., utilizing a single path that powers the wheels of the vehicle and a plurality of energy sources) or in parallel (e.g., utilizing an engine path and an electrical path to power the wheels of the vehicle). The vehicle 100 can be an on-road or off-road vehicle including, but not limited to, cars, trucks, trains, ships, boats, vans, airplanes, spacecraft, or any other type of vehicle. The engine can be configured to not be able to provide mechanical power (e.g., torque) to the drivetrain of the vehicle 100 (e.g., not able to mechanically propel the vehicle 100), and rather only able to provide electricity to the vehicle system.

As shown, the vehicle 100 includes a controller 150 communicably and operatively coupled with a brake mechanism 120 (e.g., a brake, braking system, or any other device structured to prevent or reduce motion by slowing or stopping components (e.g., a wheel, axle, pedal) of the vehicle 100), a powertrain system 110, an operator input/output (I/O) device 135, and one or more additional vehicle subsystems 140. It should be understood that the vehicle 100 can include additional, fewer, and/or different components/systems than depicted in FIG. 1, such that the principles, methods, systems, apparatuses, processes, and the like of the present disclosure are intended to be applicable with any other vehicle configuration. It should also be understood that the principles of the present disclosure should not be interpreted to be limited to on-highway vehicles. Rather, the present disclosure contemplates that the principles disclosed herein can be applied to a variety of other applications including, but not limited to, off-highway vehicles such as construction equipment, mining equipment, marine equipment, locomotive equipment, etc.

As shown, the vehicle 100 includes the powertrain system 110, which is structured to facilitate power transfer from the motor 113 and/or the battery 132 to power the vehicle 100. In an example embodiment, the vehicle (e.g., a series hybrid electric vehicle, a parallel hybrid electric vehicle) can be propelled by the powertrain system 110. The powertrain system 100 includes a motor 113 operably coupled with a battery 132 and a charge system 134, where the motor 113 is structured to transfer power to the final drive (shown as wheels 115). As depicted, the powertrain system 110 includes various vehicle systems and/or components that can be included in a hybrid electric vehicle, such as for example, an engine 111 operably coupled with a motor 113 and a differential 114 (e.g., in the case of a direct drive system), where the differential 114 can transfer power output from the engine 111 to the final drive (shown as wheels 115) to propel the vehicle 100. In some embodiments, the engine 111 is operably coupled with the motor 113 and a transmission 112 that is then operatively coupled with the differential 114. As a brief overview, and as shown in this configuration, the controller 150 of the vehicle 100 (e.g., a hybrid electric vehicle) provides electricity to the motor 113 (e.g., an electric motor) in response to input received by the controller 150 from the accelerator pedal 122, and to the charge system 134 (e.g., a battery charging system, rechargeable battery), etc. In some embodiments, the electricity provided to power the motor 113 can be provided by an onboard diesel engine-generator, a hydrogen fuel cell, etc.

In some embodiments, the vehicle 100 can also include an engine system (e.g., the engine 111) which can be structured as an internal combustion engine that receives a chemical energy input (e.g., a fuel such as natural gas, gasoline, ethanol, or diesel) from the NG Fueling system 127, the diesel fueling system 125, the gasoline fueling system 129, or any other system of the fuel delivery system 130, and combusts the fuel to generate mechanical energy in the form of a rotating crankshaft. Further, the drive shaft can be structured as a one-piece, two-piece, and/or a slip-in-tube driveshaft based on the application.

The vehicle 100 can include, in some embodiments, an exhaust aftertreatment system 144 structured to reduce diesel exhaust emissions. The exhaust aftertreatment system 144 can include a selective catalytic reduction (SCR) catalyst, a diesel oxidation catalyst (DOC), a diesel particulate filter (DPF), a diesel exhaust fluid (DEF) doser with a supply of diesel exhaust fluid, and a plurality of sensors for monitoring the exhaust aftertreatment system 144 (e.g., a NOx sensor).

Exhaust gas can flow from the engine 111 into inlet piping of the exhaust aftertreatment system 144. From the inlet piping, the exhaust gas flows into the DOC and exits the DOC into a first section of exhaust piping. The exhaust gas then flows into the DPF and exits the DPF into the SCR catalyst. As the exhaust gas flows, it is periodically dosed with DEF by the DEF doser. After the exhaust gas flows into an ammonia oxidation (AMOX) catalyst, the exhaust gas is expelled from the exhaust aftertreatment system 144.

Generally, the DOC is structured to oxidize at least some particulate matter, e.g., the soluble organic fraction of soot, in the exhaust and reduce unburned hydrocarbons and carbon monoxide in the exhaust to less environmentally harmful compounds. For example, the DOC can sufficiently reduce the hydrocarbon and carbon monoxide concentrations in the exhaust to meet one or more requisite emissions standards for those components of the exhaust gas. An indirect consequence of the oxidation capabilities of the DOC is the ability of the DOC to oxidize nitric oxide (NO) into nitrogen dioxide ($NO_2$). In this manner, the level of $NO_2$ exiting the DOC is equal to the $NO_2$ in the exhaust gas generated by the engine 111 plus the $NO_2$ converted from NO by the DOC. Accordingly, one metric for indicating the condition of the DOC is the $NO_2$/NOx ratio of the exhaust gas exiting the DOC.

In addition to treating the hydrocarbon and carbon monoxide concentrations in the exhaust gas, the DOC can also be used in the controlled regeneration of the DPF, SCR catalyst, and AMOX catalyst. This can be accomplished through the injection, or dosing, of unburned hydrocarbons into the exhaust gas upstream of the DOC. Upon contact with the DOC, the unburned hydrocarbons undergo an exothermic oxidation reaction which leads to an increase in the temperature of the exhaust gas exiting the DOC and subsequently entering the DPF, SCR catalyst, and/or the AMOX catalyst. The amount of unburned hydrocarbons added to the exhaust gas is selected to achieve the desired temperature increase or target controlled regeneration temperature.

The DPF can be any of various flow-through designs known in the art, and structured to reduce particulate matter concentrations, e.g., soot and ash, in the exhaust gas to meet requisite emission standards. The DPF captures particulate matter and other constituents, and thus needs to be periodically regenerated to burn off the captured constituents. Additionally, the DPF can be structured to oxidize NO to form $NO_2$ independent of the DOC.

The SCR system can include a reductant delivery system with a reductant (e.g., DEF) source pump and delivery mechanism or doser. The reductant source can be a container or tank capable of retaining a reductant, such as, for example, ammonia ($NH_3$), DEF (e.g., urea), or diesel oil. In some embodiments, the reductant can either be ammonia or DEF, which decomposes to produce ammonia. The ammonia reacts with NOx in the presence of the SCR catalyst to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst in the presence of $NH_3$. However, as discussed above, the chemical reduction of $NO_2$ to $N_2$ and $H_2O$ typically is the most efficient chemical reaction. Therefore, in general, the more $NO_2$ in the exhaust gas stream compared to NO, the more efficient the NOx reduction performed by the SCR catalyst. Accordingly, the ability of the DOC to convert NO to $NO_2$ directly affects the NOx reduction efficiency of the SCR system. Put another way, the NOx reduction efficiency of the SCR system corresponds at least indirectly to the condition or performance of the DOC. However, primarily, the NOx reduction efficiency of the SCR system corresponds with the condition or performance of SCR catalyst.

The AMOX catalyst is structured to react with ammonia to produce mainly nitrogen. The AMOX catalyst is utilized to remove ammonia that has slipped through or exited the SCR catalyst without reacting with NOx in the exhaust. In certain instances, the exhaust aftertreatment system 144 can be operable with or without an AMOX catalyst. In some embodiments, the AMOX catalyst can be integrated with the SCR catalyst (e.g., the AMOX catalyst and the SCR catalyst can be located within the same housing). The condition of the AMOX catalyst can be represented by the performance of the AMOX catalyst (e.g., the ability of the AMOX catalyst to convert ammonia into mainly nitrogen).

Various sensors 123 (e.g., NOx sensors, temperature sensors) can be strategically disposed throughout the exhaust aftertreatment system 144 and can be in communication with the controller 150 to monitor operating conditions of a vehicle system (e.g., the engine 111). Although various sensors 123 can be included in the exhaust aftertreatment system 144, the one or more sensors 123 (e.g., an engine sensor, motor sensor, speed sensor, torque sensor, ambient pressure sensor, temperature sensor) can be disposed proximate to and/or can be communicatively coupled with other vehicle systems and components of the vehicle 100.

The accelerator pedal 122 can be structured as any type of torque and/or speed request device included with a system (e.g., a floor-based pedal, an acceleration lever). Further, the sensors 123 can include any type of sensors included with the brake mechanism 120, accelerator pedal 122, or any other component and/or system included in the powertrain system 110 of a vehicle. For example, the sensors 123 can include a fuel temperature sensor, a charge air temperature sensor, a coolant temperature and pressure sensor, an ambient air temperature and pressure sensor, a fuel pressure sensor, an injection pump speed sensor, and the like.

As depicted, the vehicle 100 includes the operator I/O device 135. The operator I/O device 135 enables an operator of the vehicle to communicate with the vehicle 100 and the controller 150. The I/O device 135 also enables the vehicle or controller 150 to communicate with the operator. For example, the operator I/O device 135 can include, but is not limited to, an interactive display (e.g., a touchscreen) having one or more buttons/input devices, haptic feedback devices, an accelerator pedal, a brake pedal, a shifter for the transmission, a cruise control input setting, a navigation input setting, etc. Via the I/O device 135, the controller 150 can also provide commands/instructions/information to the operator (or a passenger). For example, the controller 150 can cause the I/O device 135 to alert an operator of vehicle occupant of a condition by turning on a light or through a graphic and audible alert.

The controller 150 is communicably and operatively coupled with one or more systems of the vehicle 100 such as the engine system 111, motor system 113, fuel delivery system 130, exhaust aftertreatment system 144, etc. Communication between and among the components of the vehicle 100 systems can be via any number of wired or wireless connections (e.g., any standard under IEEE 802). For example, a wired connection can include a serial cable, a fiber optic cable, an SAE J1939 bus, a CAT5 cable, or any other form of wired connection. In comparison, a wireless connection can include the Internet, Wi-Fi, Bluetooth, Zigbee, cellular, radio, etc. In one embodiment, a controller area network (CAN) bus including any number of wired and wireless connections enabling the exchange of signals, information, and/or data. Because the controller 150 is communicably coupled with the systems and components of the vehicle 100 of FIG. 1, the controller 150 is structured to receive data (e.g., instructions, commands, signals, values) from one or more of the components shown in FIG. 1.

Figure 2:
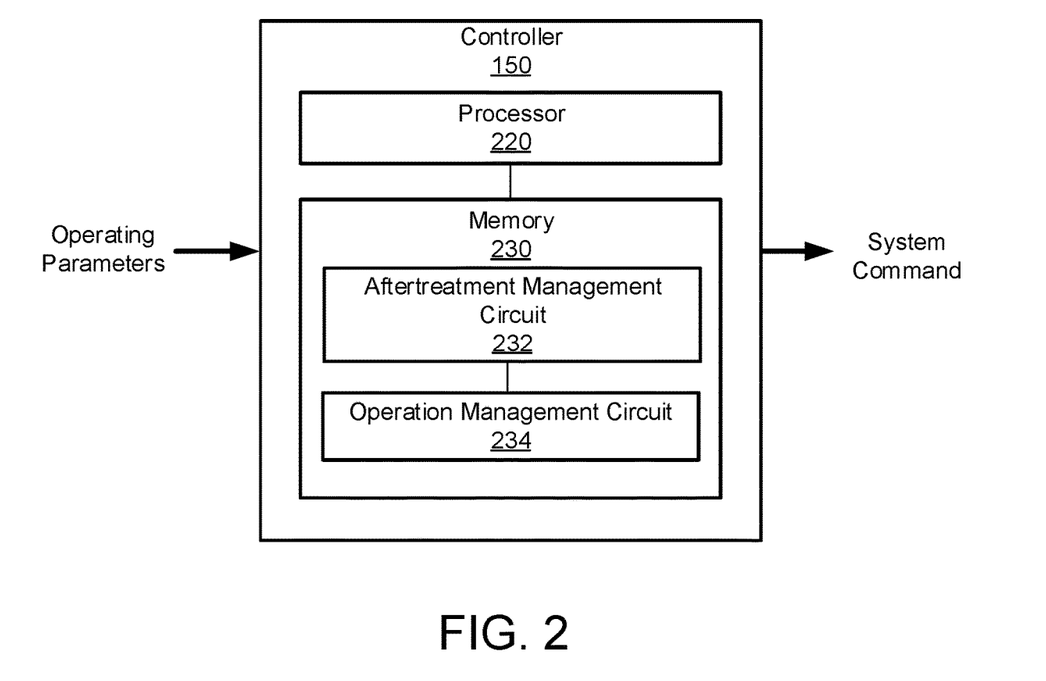
FIG. 2 is a more detailed schematic block diagram of the controller of FIG. 1.

The controller 150 can be communicatively coupled with, or included within, the powertrain system 110. As shown in FIG. 2, the controller 150 can include a processor 220 such as, but not limited to, a microprocessor, programmable logic controller (PLC) chip, an ASIC chip, or any other suitable processor. The processor 220 is in communication with the memory 230 and is structured to execute instructions, algorithms, commands or programs stored in the memory 230. The memory 230 includes any of the memory and/or storage components discussed herein. For example, the memory 230 can include RAM and/or a cache of the processor. The memory 230 can also include one or more storage devices (e.g., hard drives, flash drives, computer readable media) either local or remote to the controller 150. The memory is structured to store look up tables, algorithms, instructions, and the like. Further, as the components of FIG. 1 are shown to be embodied in a vehicle 100, the controller 150 can be structured as, include, or be communicably and operatively coupled with at least one of a power electronics system, motor controller, powertrain system controller, engine control circuit, battery management system, etc.

FIG. 2 is a schematic block diagram of a controller 150 included in the vehicle management system 100 according to an example embodiment. The controller 150 can be communicatively coupled (e.g., via an over air transfer, the Internet, any type of network as described herein, or a combination thereof) with a location positioning system (e.g., a GPS). In further embodiments, the controller 150 can be communicatively coupled with one or more telematics units such that one or more controllers 150 and/or telematics units are structured to carry out the features as described herein. In the present embodiment, the controller 150 includes a processor 220, memory 230, or other computer readable medium. It should be understood that the controller 150 of FIG. 2 depicts only one embodiment of the controller 150, and that other systems capable of performing the operations described herein can be used.

The processor 220 can include a microprocessor, programmable logic controller (PLC) chip, an ASIC chip, or any other suitable processor. The processor 220 is in communication with the memory 230 and structured to execute instructions, algorithms, commands, or programs stored in the memory 230.

The memory 230 includes any of the memory and/or storage components discussed herein. For example, the memory 230 can include RAM and/or a cache of the processor 220. The memory 230 can also include one or more storage devices (e.g., flash drives, hard drives, computer readable media) either local or remote to the controller 150. The memory 230 is structured to store look up tables, algorithms, and instructions.

The memory 230 includes an aftertreatment management circuit 232. The aftertreatment management circuit 232 is structured to receive one or more parameters associated with an exhaust aftertreatment system. The operating parameters can be received from various components, circuits, controllers, systems (e.g., the engine system, generator system, motor system, aftertreatment system), etc. that can be internal and/or external to the vehicle 100. The operating parameters can include temperature data (e.g., temperatures associated with the exhaust aftertreatment system 144), regeneration data (e.g., a regeneration status), vehicle weight, ambient conditions, or any other suitable parameter. The one or more parameters can be associated with an aftertreatment event. The aftertreatment event can be associated with the aftertreatment system 144. In some examples, the aftertreatment event can include a regeneration event, a desorption event, etc. Utilizing one or more parameters (e.g., temperatures, regen status) as an input enables the control of various systems such as, but not limited to, the engine 111, the motor 113, the battery 132, the charge system 134, the generator, and/or any other system, component, or device of the vehicle 100. For example, utilizing the aftertreatment temperatures as an input into controller 150 associated with the engine 111 and/or the generator improves the efficiency and durability of the exhaust aftertreatment system 144.

The controller 150 includes a component management circuit 234. The component management circuit 234 can be structured to determine an operation state of the system based on the one or more parameters. For example, the component management circuit 234 can be structured to determine an operation state of an engine system, a generator system, an electric motor system, aftertreatment system, battery, or any other suitable system. The component management circuit 234 can receive or otherwise retrieve the one or more parameters from the aftertreatment management circuit 232 and/or the memory 230 to determine the operation state of a system. In some examples, the controller 150 can be further structured to determine whether an aftertreatment event is in progress based on the one or more parameters. For example the component management circuit 234 can determine whether the aftertreatment system 144 is currently undergoing regeneration (e.g., regeneration of an aftertreatment device is in progress) of the DPF, the SCR, etc. Alternatively or additionally, the component management circuit 234 can determine whether the aftertreatment system 144 is currently undergoing an aftertreatment event, such as a desorption process (e.g., removing absorbed hydrocarbons, removing "coke," minimizing deposits, particulate matter), to clean the aftertreatment system.

The controller 150 can generate a command structured to adjust operation of a system (e.g., an engine system, a generator system, an electric motor system, aftertreatment system, battery) responsive to the determination of the operation state via the component management circuit 234. The command can cause the adjustment of the operation state of the system such that the controller can adjust the operation of the system between operation states. In some examples, adjustment of the operation of a system (e.g., the engine 111) comprises moving the system between an operation state (e.g., the current operation state) and a second operation state (e.g., another operation state). As described herein, the component management circuit 234 can determine whether an aftertreatment event is in progress. If an aftertreatment event is in progress, the component management circuit 234 can adjust (e.g., modify) operation of the system. In some examples, the command can be structured to keep the engine 111 in a particular operation state (e.g., in the powered-on state) such that the aftertreatment event can progress further, be completed, and/or terminated. In some examples, the command can be structured to move the engine 111 between an operation state (e.g., a current powered-on state) and a second operation state (e.g., a current powered-off state, or a state that includes an increase and/or decrease in output, an increase or decrease in power consumption, a decrease or increase in functionality) to reduce the use of the engine 111.

The command can be structured to increase a load corresponding to the system responsive to a restart of the system. In this regard, the command can increase the load associated with the engine 111 and/or the generator above the load necessary to operate the vehicle 100 after the engine restarts to quickly raise the exhaust aftertreatment system 144 temperature to a suitable temperature for more efficient exhaust aftertreatment system 144 operation. In some examples, the command can be structured to store power in an energy storage device. To that end, the power generated in excess of the power needed to operate the vehicle 100 can be stored in an energy storage device for later use. For example, the excess power can be stored in the battery 132.

The command can be structured to schedule power generation and power usage of the system. For example, the engine 111 and/or the generator power can be scheduled. In some examples, the command generated can be structured to reduce emissions from the vehicle 100 responsive to the scheduled power. For example, the engine 111 and/or the generator power can be scheduled to reduce net emissions by improving the operating conditions of the exhaust aftertreatment system 144 in response to the command adjusting the operation of a system between a first operation state and a second operation state. In some examples, the command can be structured to schedule a start, a stop, and/or a stop duration of a system based on the one or more parameters. In turn, the command can be structured to reduce emissions from the vehicle 100 responsive to the scheduled start, stop, stop duration, etc. to insure net emissions requirements are met or not exceeded and to improve (e.g., optimize) exhaust aftertreatment system operating conditions.

In some examples, the aftertreatment management circuit 232 can receive one or more parameters that indicate that a DEF tank has not been refilled. The component management circuit 234 can be structured to determine an operation state of a system based on the one or more parameters. For example, the component management circuit 234 can be structured to determine that a DEF tank has not been refilled based on the one or more parameters. In turn, the component management circuit 234 can be structured to generate a command to adjust the operation of the engine 111. The command generated can be structured to move the engine 111 from the operation state (e.g., a powered-on state) determined to a second operation state (e.g., a powered-off state) such that the vehicle 100 adjusts (e.g., switches) operation to electric only power (e.g., engine-off, engine only generating electric power for storage). Alternatively or additionally, the command can be structured to derate electric traction power.

In some examples, the aftertreatment management circuit 232 can monitor the aftertreatment temperature and, thereby, receive one or more parameters that indicate that the aftertreatment temperature is below a predetermined threshold (e.g., that the temperature is too cold). The component management circuit 234 can be structured to determine an operation state of a system (e.g., the exhaust aftertreatment system and/or the engine 111) based on the aftertreatment temperature being below the predetermined threshold. If the aftertreatment temperature is too cold (e.g., after the engine 111 is stopped, inactive, or otherwise powered-off), the component management circuit 234 can generate a command structured to adjust operation of the engine 111. For example, the command generated can be structured to move the engine 111 from the operation state (e.g., a powered-off state) determined to a second operation state (e.g., a powered-on state). Alternatively or additionally, the component management circuit 234 can be structured to determine the rate of cooling of the aftertreatment. Based on the rate of cooling, the component management circuit 234 can predict when the aftertreatment will drop below a temperature and, thereby, generate a command structured to adjust operation of the engine 111 from a powered-off state to a powered-on state before the aftertreatment temperature moves below the predetermined threshold.

In some examples, the exhaust aftertreatment system 144 (e.g., catalysts, DEF tank and/or lines, or any other component of the exhaust aftertreatment system 144) of the vehicle 100 can be preheated using an external power source. When the vehicle 100 is plugged-in, an electric heater can be utilized to warm the exhaust aftertreatment system 144 so the exhaust aftertreatment system 144 is warm when starting. In examples wherein the engine 111 is started upon initialization, for example each day, to ensure the engine 111 is functioning before the vehicle 100 begins a daily mission, the preheating of the exhaust aftertreatment system 144 can be timed or otherwise scheduled to occur prior to the expected start of the daily mission to reduce energy wastes used at the start of the daily mission. Alternatively or additionally, the time needed to preheat the exhaust aftertreatment system 144 can be adjusted based on ambient temperatures from a calibratable floor to a calibratable ceiling based on a characteristic of the exhaust aftertreatment system 144 (e.g., a size, measurement, material, and/or dimension of various components of the exhaust aftertreatment system 144).

In another example embodiment, the battery 132 produces heat during charging and discharging. The heat produced by the battery 132 can be diverted (e.g., mechanically or electrically) by the controller 150 to heat another component or system of the vehicle 100. For example, the controller 150 can divert heat produced by the battery 132 to heat a passenger cabin of the vehicle 100, a DEF tank, a DEF line, or a garage where the vehicle is parked.

Figure 3:
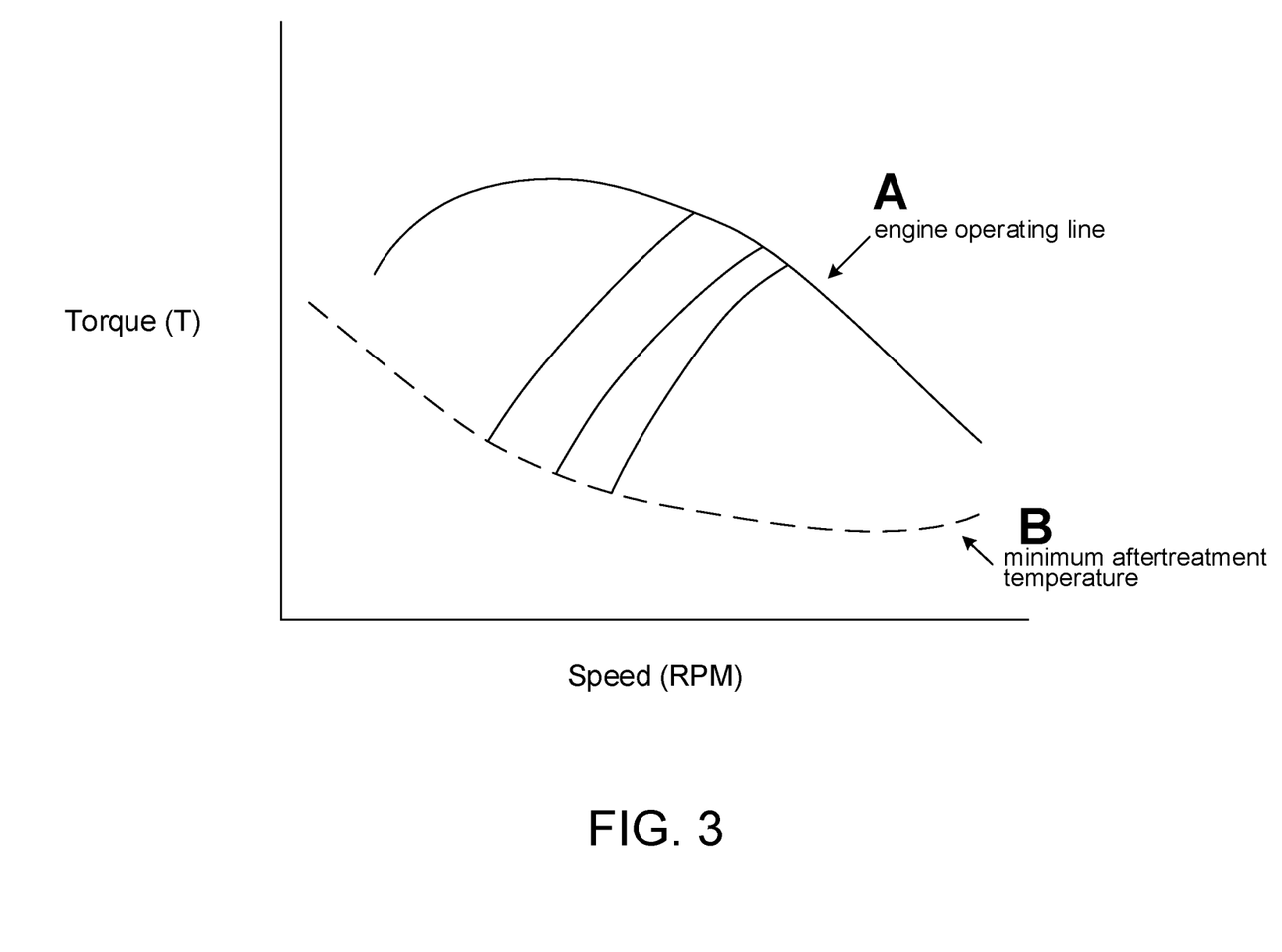
FIG. 3 is a diagram of an engine operating line relative to a minimum aftertreatment temperature according to some embodiments.

FIG. 3 is a diagram of an engine operating line A relative to a minimum aftertreatment temperature line B according to an example embodiment. The controller 150 can adjust operation of any system or component of the vehicle 100 based on the engine operating line A and the minimum aftertreatment temperature line B. As shown in FIG. 3, range extender controls of a vehicle 100 can define a desired engine operating line A (with a range above/below). In some embodiments, the engine operating line A can be past peak torque. In some examples, the minimum aftertreatment temperature line B can be included as an input and can act as a constraint on the engine operating line A. The minimum aftertreatment temperature line B can be static or dynamic depending on one or more parameters. For example, if a urea deposit is detected, the minimum aftertreatment temperature line B can be raised. The minimum aftertreatment temperature line B can be static or dynamic depending on how long the engine 111 has been running. In some examples, the minimum aftertreatment temperature line B can be static or dynamic depending on the current temperature of the exhaust aftertreatment system 144. For example, the minimum aftertreatment temperature line B can be lowered based on how warm the aftertreatment system 144 is to increase the operating range of the engine 111 for excursions. In another example, the minimum aftertreatment temperature line B can be lowered based on a soot load of a diesel particulate feature (DPF) of the system.

Figure 4:
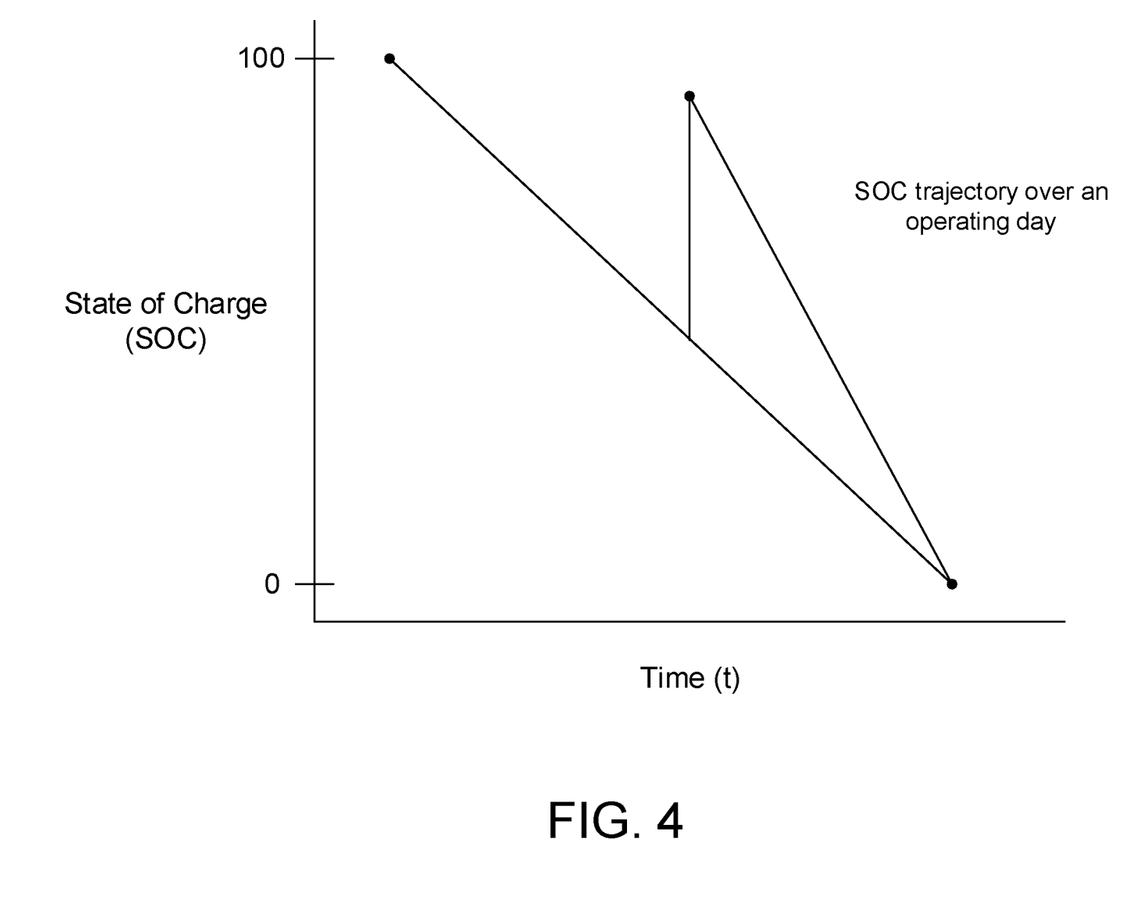
FIG. 4 is a diagram of a state of charge trajectory over an operating day according to some embodiments.

FIG. 4 is a diagram of a state of charge (SOC) trajectory over an operating day according to an example embodiment. The controller 150 can adjust operation of any system or component of the vehicle 100 based on the SOC trajectory. For example, the SOC trajectory line can decline linearly throughout the day. When an aftertreatment event (e.g., a regeneration event) is taking place on the vehicle 100, the controller 150 can be structured to continue operation of the engine 111 (e.g., keep the engine 111 running) longer than may be required based on the position of the battery SOC trajectory to take advantage of the right temperature conditions to complete the aftertreatment event more efficiently. For example, even though the battery SOC may be adequate for a current condition of the vehicle 100, the controller 111 is structured to keep the engine 111 running to maintain or alter the temperature of the exhaust aftertreatment system 144 if a regeneration event is currently occurring and if maintaining or altering the temperature of the exhaust aftertreatment system 144 would maintain or increase the efficiency of the regeneration event (whereas if the regeneration event was not currently occurring, the controller 150 shuts down the engine due to the SOC being sufficient). In this example, any excess electrical energy produced by the engine 111 can be used for powering other components of the vehicle 100 (e.g., such as an HVAC system).

In some examples, the electric heating system of the vehicle 100 can include at least one of a heater (e.g., an electrical heater) in the aftertreatment system 144, a heated catalyst material, or wrapped heaters around one or more aftertreatment components of the aftertreatment system 144 to raise ambient temperatures. If a SOC of the battery 132 is running according to or along the SOC trajectory line illustrated in FIG. 4, regenerative braking energy can be used to power the electric heater. If a SOC of the battery 132 is running above the SOC trajectory line illustrated in FIG. 4, excess electrical energy can be used to power the electrical heater.

The diagrams and methods described above are generally set forth as logical flow chart diagrams. As such, the depicted order and labeled steps are indicative of representative embodiments. Other steps, orderings and methods can be conceived that are equivalent in function, logic, or effect to one or more steps, or portions thereof, of the methods illustrated in the schematic diagrams.

Additionally, the format and symbols employed are provided to explain the logical steps of the schematic diagrams and it will be understood that they do not limit the scope of the methods illustrated by the diagrams. Although various arrow types and line types can be employed in the schematic diagrams, they are understood not to limit the scope of the corresponding disclosure. Indeed, some arrows or other connectors can be used to indicate only the logical flow of a method or system. For instance, an arrow can indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits in order to more particularly emphasize their implementation independence. For example, a circuit can be implemented as a hardware circuit comprising custom VLSI circuits or gate arrays, off-the-shelf semiconductors such as logic chips, transistors, or other discrete components. A circuit can also be implemented in programmable hardware devices such as field programmable gate arrays, programmable array logic, programmable logic devices or the like.

Circuits can also be implemented in machine-readable medium for execution by various types of processors. An identified circuit of executable code can, for instance, comprise one or more physical or logical blocks of computer instructions, which can, for instance, be organized as an object, procedure, or function. Nevertheless, the executables of an identified circuit need not be physically located together, but can comprise disparate instructions stored in different locations which, when joined logically together, comprise the circuit and achieve the stated purpose for the circuit.

Indeed, a circuit of computer readable program code can be a single instruction, or many instructions, and can even be distributed over several different code segments, among different programs, and across several memory devices. Similarly, operational data can be identified and illustrated herein within circuits, and can be embodied in any suitable form and organized within any suitable type of data structure. The operational data can be collected as a single data set, or can be distributed over different locations including over different storage devices, and can exist, at least partially, merely as electronic signals on a system or network. Where a circuit or portions of a circuit are implemented in machine-readable medium (or computer-readable medium), the computer readable program code can be stored and/or propagated on in one or more computer readable medium(s).

The computer readable medium can be a tangible computer readable storage medium storing the computer readable program code. The computer readable storage medium can be, for example, but not limited to, an electronic, magnetic, optical, electromagnetic, infrared, holographic, micromechanical, or semiconductor system, apparatus, or device, or any suitable combination of the foregoing.

More specific examples of the computer readable medium can include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium can be any tangible medium that can contain, and/or store computer readable program code for use by and/or in connection with an instruction execution system, apparatus, or device.

The computer readable medium can also be a computer readable signal medium. A computer readable signal medium can include a propagated data signal with computer readable program code embodied therein, for example, in baseband or as part of a carrier wave. Such a propagated signal can take any of a variety of forms, including, but not limited to, electrical, electro-magnetic, magnetic, optical, or any suitable combination thereof. A computer readable signal medium can be any computer readable medium that is not a computer readable storage medium and that can communicate, propagate, or transport computer readable program code for use by or in connection with an instruction execution system, apparatus, or device. Computer readable program code embodied on a computer readable signal medium can be transmitted using any appropriate medium, including but not limited to wireless, wireline, optical fiber cable, Radio Frequency (RF), or the like, or any suitable combination of the foregoing.

In one embodiment, the computer readable medium can comprise a combination of one or more computer readable storage mediums and one or more computer readable signal mediums. For example, computer readable program code can be both propagated as an electro-magnetic signal through a fiber optic cable for execution by a processor and stored on RAM storage device for execution by the processor.

Computer readable program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The computer readable program code can execute entirely on the user's computer, partly on the user's computer, as a stand-alone computer-readable package, partly on the user's computer and partly on a computer or entirely on the computer or server. In the latter scenario, the computer can be connected to the user's computer through any type of network, including a local area network (LAN) or a wide area network (WAN), or the connection can be made to an external computer (for example, through the Internet using an Internet Service Provider).

The program code can also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure can be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope. No claim element herein is to be construed under the provisions of 35 U.S.C. § 112, sixth paragraph, unless the element is expressly recited using the phrase "means for."

What is claimed is:

1. A system comprising:
   one or more processing circuits communicably coupled with a vehicle system of an electric vehicle and an exhaust aftertreatment system of the electric vehicle, the one or more processing circuits comprising one or more memory devices coupled to one or more processors including an aftertreatment management circuit and a component management circuit, the one or more memory devices structured to store instructions thereon that, when executed by the one or more processors, cause the one or more processors to:
receive, via the aftertreatment management circuit, one or more parameters associated with the exhaust aftertreatment system, the one or more parameters being associated with an aftertreatment event associated with the exhaust aftertreatment system;
determine, via the component management circuit, an operation state of the vehicle system based on the one or more parameters; and
generate, via the component management circuit, a command structured to adjust operation of the vehicle system responsive to the determination of the operation state of the vehicle system, wherein the command is structured to schedule, based on a time, powering of the vehicle system.

2. The system of claim 1, wherein the one or more memory devices are further structured to store instructions thereon that, when executed by the one or more processors, cause the one or more processors to: determine, via the component management circuit, whether the aftertreatment event is in progress based on the one or more parameters.

3. The system of claim 1, wherein the vehicle system comprises an engine system, a generator system, an electric motor system, battery, or a combination thereof.

4. The system of claim 1, wherein the one or more parameters comprises a temperature, regeneration status, or a combination thereof, and wherein the aftertreatment event comprises a regeneration event, desorption event, or a combination thereof.

5. The system of claim 1, wherein the command is structured to increase a load corresponding to the vehicle system responsive to a restart of the vehicle system.

6. The system of claim 1, wherein the command is structured to store excess power in an energy storage device.

7. The system of claim 1, wherein the command structured to schedule powering of the vehicle system is structured to reduce emissions from the electric vehicle responsive to the scheduled powering.

8. The system of claim 1, wherein the command is structured to schedule a start, stop, stop duration, or a combination thereof of the vehicle system, and wherein the command is structured to reduce emissions from the electric vehicle responsive to the scheduled start, stop, stop duration, or a combination thereof.

9. The system of claim 1, wherein the operation state is a first operation state, and wherein adjustment of the operation of the vehicle system comprises moving the vehicle system between the first operation state and a second operation state.

10. An apparatus structured to control operation of a vehicle system of an electric vehicle based on one or more parameters associated with an exhaust aftertreatment system, the apparatus comprising:
one or more processing circuits communicably coupled with the vehicle system of the electric vehicle and the exhaust aftertreatment system of the electric vehicle, the one or more processing circuits comprising one or more memory devices coupled to one or more processors including an aftertreatment management circuit and a component management circuit, the one or more memory devices structured to store instructions thereon that, when executed by the one or more processors, cause the one or more processors to:
receive, via the aftertreatment management circuit, the one or more parameters associated with the exhaust aftertreatment system of the electric vehicle, the one or more parameters being associated with an aftertreatment event associated with the exhaust aftertreatment system;
determine, via the component management circuit, an operation state of the vehicle system of the electric vehicle based on the one or more parameters; and
generate, via the component management circuit, a command structured to adjust operation of the vehicle system responsive to the determination of the operation state of the vehicle system, wherein the command is structured to schedule, based on a time, powering of the vehicle system.

11. The apparatus of claim 10, wherein the one or more memory devices are further structured to store instructions thereon that, when executed by the one or more processors, cause the one or more processors to: determine, via the component management circuit, whether the aftertreatment event is in progress based on the one or more parameters.

12. The apparatus of claim 10, wherein the vehicle system comprises an engine system, a generator system, an electric motor system, battery, or a combination thereof.

13. The apparatus of claim 10, wherein the one or more parameters comprises a temperature, regeneration status, or a combination thereof, and wherein the aftertreatment event comprises a regeneration event, desorption event, or a combination thereof.

14. A method for controlling operation of a vehicle system of an electric vehicle based on one or more parameters associated with an exhaust aftertreatment system, the method comprising:
receiving, via an aftertreatment management circuit, one or more parameters associated with the exhaust aftertreatment system of the electric vehicle, the one or more parameters being associated with an aftertreatment event associated with the exhaust aftertreatment system;
determining, via a component management circuit, an operation state of the vehicle system of the electric vehicle based on the one or more parameters; and
generating, via the component management circuit, a command structured to adjust operation of the vehicle system based on the determined operation state of the vehicle system, wherein the command is structured to schedule, based on a time, powering of the vehicle system.

15. The method of claim 14, further comprising determining, via the component management circuit, whether the aftertreatment event is in progress based on the one or more parameters.

16. The method of claim 14, wherein the one or more parameters comprises a temperature, regeneration status, or a combination thereof.

17. The method of claim 14, wherein the aftertreatment event comprises a regeneration event, desorption event, or a combination thereof.

18. The method of claim 14, wherein the command is structured to increase a load corresponding to the vehicle system responsive to a restart of the vehicle system.

19. The method of claim 14, wherein the command is structured to store excess power in an energy storage device.

20. The method of claim 14, wherein the command structured to schedule powering of the vehicle system is structured to reduce emissions from the electric vehicle responsive to the scheduled powering.

\* \* \* \* \*